E. ERICSON.
SEED CORN RACK.
APPLICATION FILED MAR. 11, 1914.
1,111,061. Patented Sept. 22, 1914.
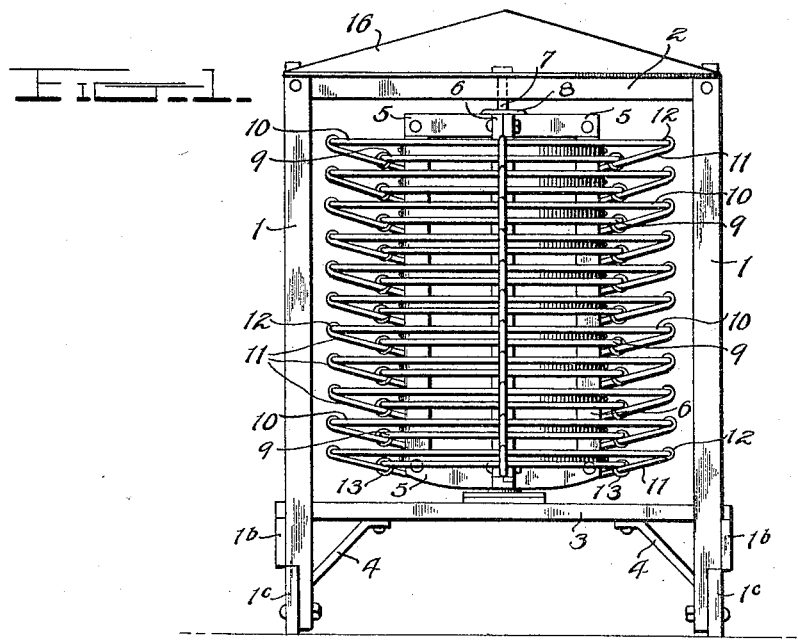
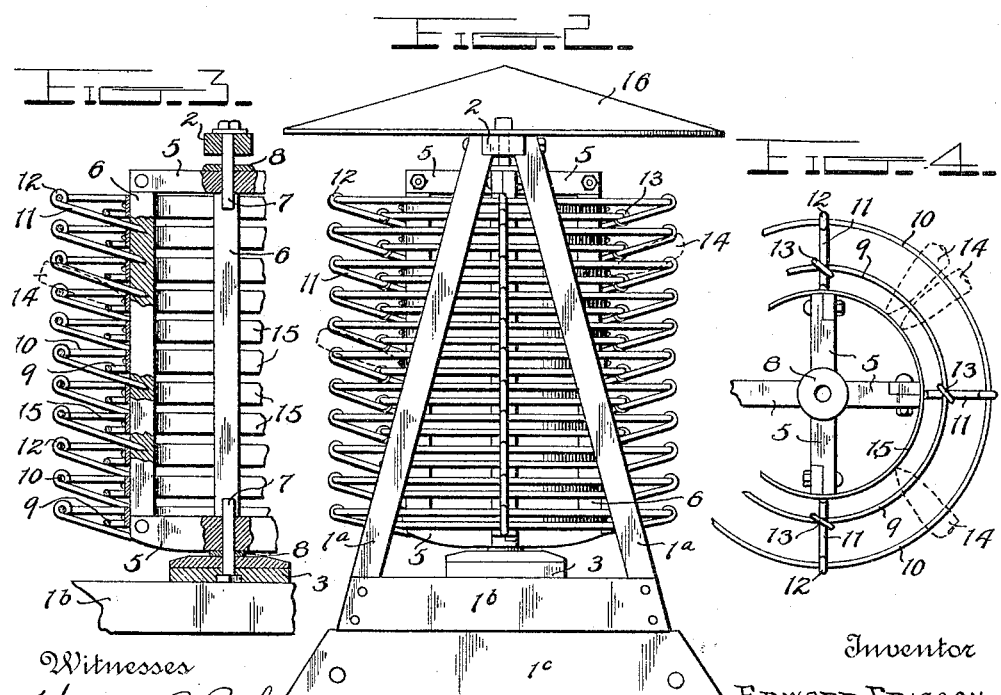
Witnesses
Harry B. Rook.
Harriet B. Cornwall.
Inventor
EDWARD ERICSON
By N. S. Hie
Attorney

UNITED STATES PATENT OFFICE.

EDWARD ERICSON, OF VERMILION, SOUTH DAKOTA.

SEED-CORN RACK.

1,111,061.  Specification of Letters Patent. Patented Sept. 22, 1914.

Application filed March 11, 1914. Serial No. 824,018.

*To all whom it may concern:*

Be it known that I, EDWARD ERICSON, citizen of the United States, residing at Vermilion, in the county of Clay and State of South Dakota, have invented certain new and useful Improvements in Seed-Corn Racks, of which the following is a specification.

The present invention relates to certain new and useful improvements in the construction of seed corn racks, and has for its object to provide a device of this character which embodies novel features of construction whereby a large amount of seed corn can be stored in a comparatively small amount of space, ample provision being made for a free circulation of air around each individual ear of the seed corn so that it will be preserved in the best possible condition for planting.

A further object of the invention is to provide a seed corn rack which is simple and inexpensive in its construction, which occupies but a small amount of space, which has a skeleton formation so as to admit of a free circulation of air around the seed corn, and which admits of any individual ear of seed corn being placed in position or removed therefrom without disturbing the remaining ears of seed corn.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a seed corn rack constructed in accordance with the invention. Fig. 2 is an end view of the same. Fig. 3 is a fragmentary view of one side of the seed corn rack, portions being broken away and shown in section to illustrate more clearly the details of construction. Fig. 4 is a top plan view of the revolving rack detached from the supporting frame, one side thereof being broken away.

Corresponding and like parts are referred to in the following description and indicated in all the views of the drawing by the same reference characters.

The supporting frame upon which the revolving rack is mounted, includes a pair of triangular frames or upright standards 1 which have a spaced and parallel relation and are connected by the upper cross bar 2 and lower cross bar 3. In the present instance each of the standards or triangular frames 1 is shown as composed of a pair of upwardly converging members $1^a$ connected at their lower ends by the transverse strips $1^b$ and the beams $1^c$, the latter providing the base or feet upon which the standards rest, while the former have the lower transverse bar 3 connected thereto. Diagonal braces 4 are shown as extending between the ends of the lower transverse bar 3 and the basal members or feet $1^c$ on opposite sides of the frame.

The revolving rack for supporting the seed corn is pivotally mounted between the upper cross bar 2 and lower cross bar 3, and includes a skeleton drum provided at its periphery with a series of annular and superposed shelves adapted to receive the ears of seed corn. The skeleton drum comprises upper and lower cross heads 5 which are similar in construction and are connected by a series of longitudinal strips 6. The cross heads 5 are each composed of a series of intersecting bars, which may be of any desired number, although in the present instance there are two intersecting bars in each cross head, the corresponding ends of the bars of each cross head being connected by the longitudinal strips 6 so as to provide a skeleton drum. The central points of the two cross heads 5 at the top and bottom of the skeleton drum are pivotally engaged by pins or bolts 7 projecting from the respective cross bars 2 and 3 of the supporting frame, and suitable reinforcing plates 8 may be applied to the pivot points of the cross heads. With this construction it will be obvious that the skeleton drum is arranged in an upright position and pivotally mounted between the upper and lower cross bars 2 and 3 to turn freely about a vertical axis.

Surrounding the skeleton drum and mounted thereon is a series of annular and superposed shelves, each of the shelves being formed of a pair of concentric and spaced rings 9 and 10 which are supported by upwardly inclined arms or brackets 11 projecting radially from the upright side strips 6 of the skeleton drum. These arms 11 may be formed of stout wire and have the inner ends thereof sharpened so as to be driven into the strips 6, while the outer ends thereof are returned to provide eyes 12 receiving the outer rings 10. Suitable clips or tie members 13 may be utilized for securing the inner rings 9 to the bracket arms 11. Owing to the upward inclination of the bracket arms 11 the inner rings 9 are disposed at a lower level than the outer rings 10. The ears of seed corn, as indicated by dotted lines at 14, are radially disposed with respect to the skeleton drum and are arranged in annular rows upon the several superposed shelves, the inner and outer rings 9 and 10 of the shelves serving to engage and support the ears toward opposite ends thereof, while the inner ends of the ears abut against flat guard bands which are applied to the skeleton drum immediately above each shelf. All of the ears of corn have a slight upward inclination corresponding to the upward inclination of the shelf so that they remain firmly in position and will not be disturbed or dislocated from position when the seed rack is revolved, and the inner ends of the ears abut against the flat guard bands 15 so as to be prevented from slipping inwardly and falling within the interior of the skeleton drum.

The annular formation of the shelves enables the seed corn ears to be fitted closely together, since the ears of corn are always smaller at one end than at the opposite end and in placing the ears upon the rack the smaller ends thereof are placed inwardly and caused to abut against the flat guard bands 15. At the same time, the skeleton formation of the drum and shelves permits air to circulate freely around all of the individual ears of seed corn in the required manner. By revolving the rack any desired part thereof can be quickly brought into most convenient position for placing the ears of corn thereon or removing them therefrom. It is also unnecessary to provide a separate number for each ear of seed corn, since the various shelves can be numbered and the various ears of corn upon each shelf are mounted so that they do not shift their relative positions.

If desired, a hood or roof 16 may be mounted upon the supporting frame over the revolving rack so as to prevent any drippings from falling upon the seed corn even though a leak might occur in the roof of the building within which the seed corn rack was placed. This hood or roof 16 may have a conical formation and is applied to the top of the frame so that it does not interfere in any manner with the placing of seed corn upon the rack or removing it therefrom.

Having thus described the invention, what I claim as new and desire to secure by Letters Patent, is:—

1. A seed corn rack including a supporting frame, a skeleton drum pivotally mounted upon the frame to turn about a vertical axis, a series of annular shelves projecting from the periphery of the skeleton drum, and a guard band surrounding the skeleton drum at the inner end of each shelf.

2. A seed corn rack including a supporting frame, a skeleton drum pivotally mounted upon the frame to turn about a vertical axis, and a series of superposed annular shelves surrounding the skeleton drum, each of the said shelves being formed of a series of spaced concentric rings.

3. A seed corn rack including a supporting frame, a skeleton drum pivotally mounted upon the frame to turn about a vertical axis and constructed at the periphery thereof with a series of upright strips, bracket arms projecting outwardly from the strips in annular rows, and a plurality of spaced concentric rings supported by each row of the bracket arms to provide a series of superposed annular shelves.

4. A seed corn rack including a supporting frame, a skeleton drum pivotally mounted upon the frame to turn about a vertical axis and constructed at the periphery thereof with a series of upright strips, bracket arms projecting from the said upright strips in annular rows, a plurality of spaced concentric rings supported by each annular row of bracket arms so as to provide a series of superposed shelves, and a guard band surrounding the skeleton drum at the inner end of each shelf.

5. A seed corn rack including a supporting frame, a skeleton drum pivotally mounted upon the supporting frame to turn about a vertical axis and including heads formed of intersecting bars having the ends thereof connected by upright strips, arms projecting radially from the upright strips and arranged in annular rows, a plurality of concentric rings supported by each row of the arms so as to provide a plurality of superposed shelves, and a guard band surrounding the skeleton frame at the inner end of each shelf.

6. A seed corn rack including a supporting frame, a skeleton drum pivotally mounted upon the supporting frame to turn about a vertical axis and including heads formed of intersecting bars having the ends thereof connected by upright strips, arms projecting outwardly from the upright strips and arranged in annular rows, the inner ends of the arms being driven into the strips while the outer ends thereof terminate in eyes, an outer ring passing through the eyes of each annular row of arms, an inner concentric ring resting upon each annular row of arms toward the inner end thereof for coöperation with the outer ring to provide a shelf, means for fastening the inner concentric ring to the arms, and a guard band surrounding the skeleton drum at the inner end of each shelf.

In testimony whereof I affix my signature in presence of two witnesses.

EDWARD ERICSON.

Witnesses:
 ERIC WESTLUND,
 ELSIE WILLIAMS.

---

Copies of this patent may be obtained for five cents each, by addressing the "Commissioner of Patents. Washington, D. C."